Dec. 25, 1956  W. H. CLARK, JR  2,775,724
ELECTRICAL SPEED CONTROL SYSTEM
Filed July 5, 1952  5 Sheets-Sheet 1

INVENTOR.
WILLIAM H. CLARK, JR.
BY
ATTORNEY

Dec. 25, 1956     W. H. CLARK, JR     2,775,724
ELECTRICAL SPEED CONTROL SYSTEM
Filed July 5, 1952     5 Sheets-Sheet 2

INVENTOR.
WILLIAM H. CLARK, JR.
BY
Godfrey B. Spein
ATTORNEY

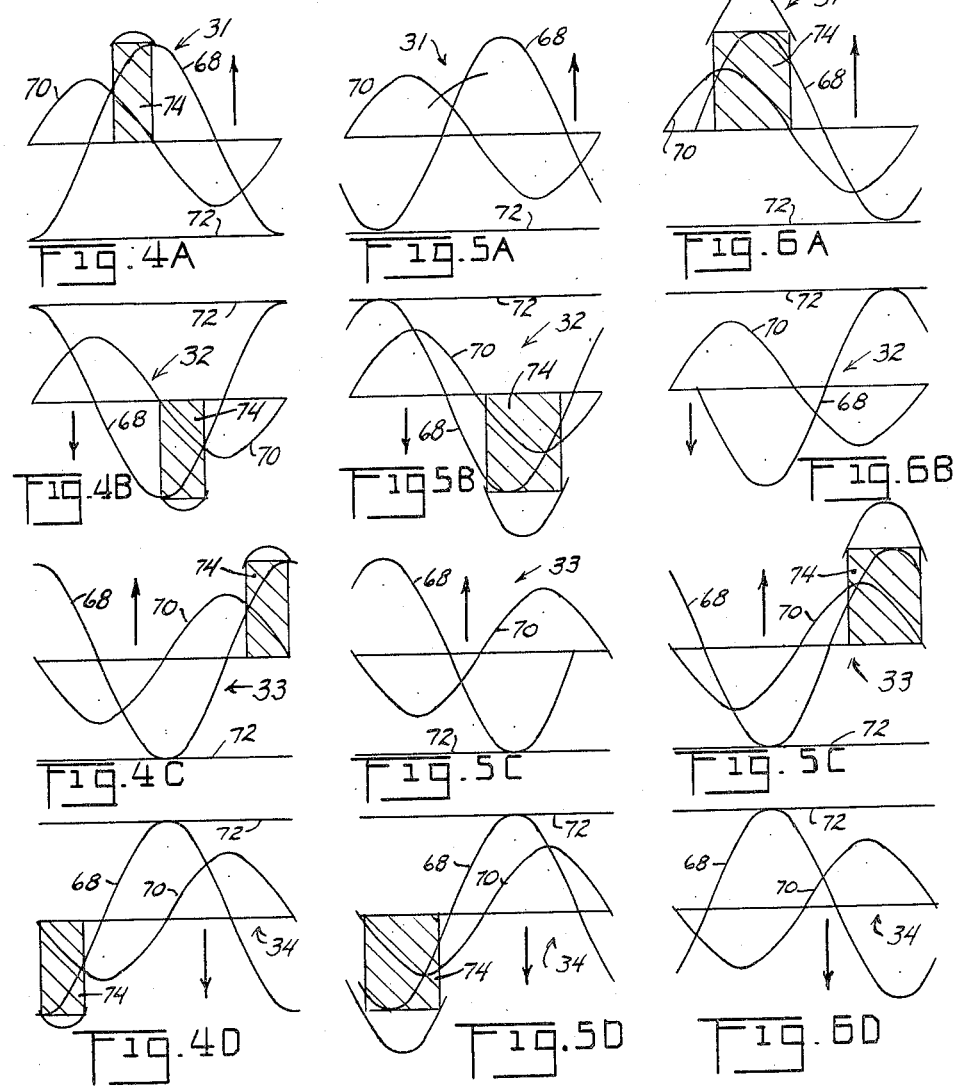

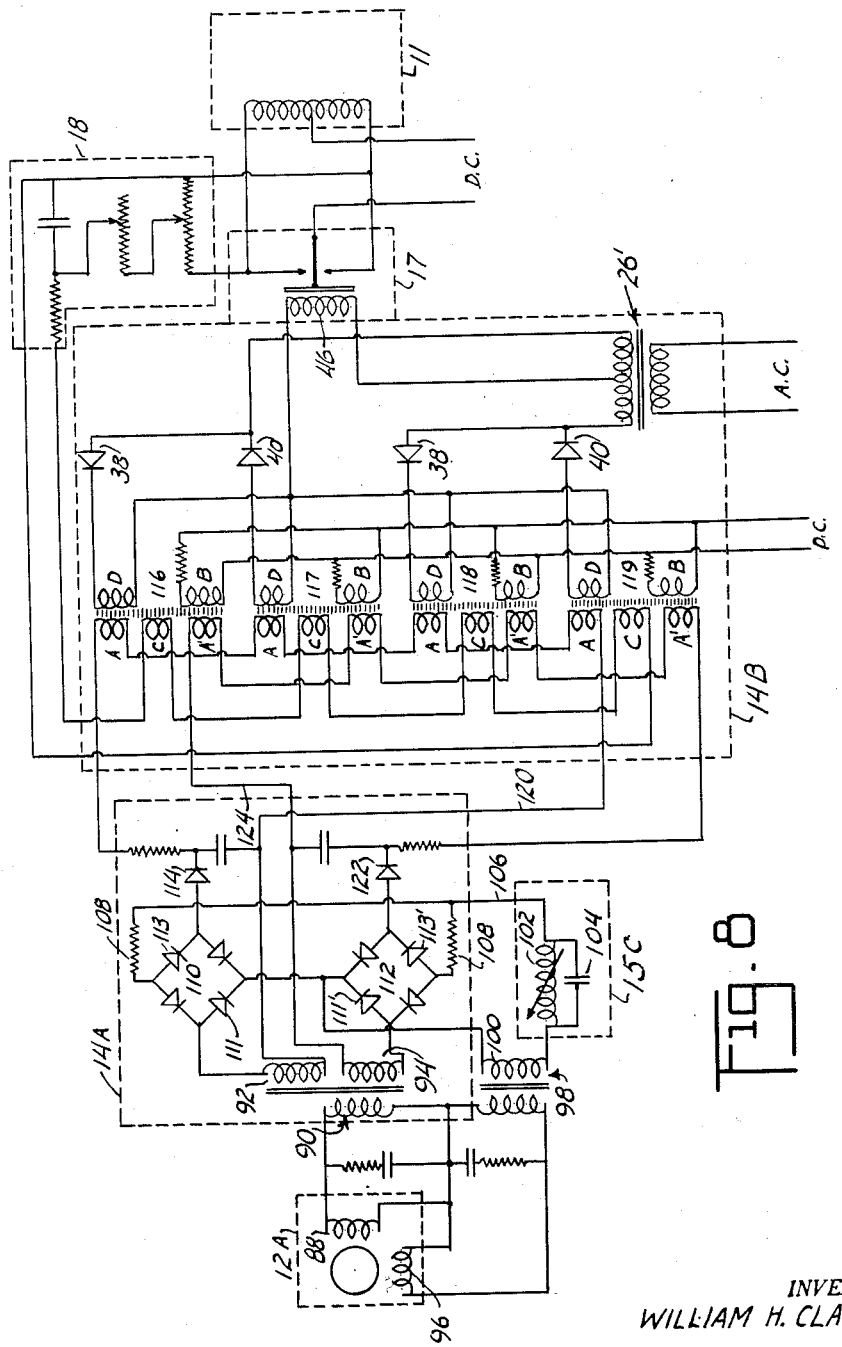

U̇nited States Patent Office 2,775,724
Patented Dec. 25, 1956

2,775,724

ELECTRICAL SPEED CONTROL SYSTEM

William H. Clark, Jr., Rutherford, N. J., assignor to Curtiss-Wright Corporation, a corporation of Delaware Application July 5, 1952, Serial No. 297,203

2 Claims. (Cl. 317—5)

This inventon relates to speed governors for prime movers or for other apparatus whose rotary or linear speed of operation is to be controlled.

The governor arrangements of this invention are particularly applicable to the speed control of aircraft power plants and to the control of pitch of the blades of engine driven aircraft propellers. The invention is based upon an electrical system of speed sensing and produces electrical signals, as a result of off-speed conditions, which are used to control a speed adjustor for the power plant.

In some respects, the present invention constitutes improvements on the control system shown and described in Paul J. Quinn Patent No. 2,541,666 issued February 13, 1951. In the Quinn patent, the speed of the prime mover was reproduced as a two phase alternating current of frequency proportional to speed of the engine. This frequency was impressed upon a tuned system of desired frequency, producing phase lag or lead when the alternator frequency differs from the tuned circuit frequency. The lag or lead was discriminated and impressed upon an electronic amplifier which produced current to operate a relay system, which actuated the pitch changer of an aeronautical propeller or other speed control mechanism. In addition, the Quinn patent inserted a synthetic signal when a pitch change occurred which was fed back to the discriminated off-speed signals to provide a control which anticipated the lag of the prime mover in reaching the on-speed condition, to terminate operation of the speed changer before the on-speed condition was reached, whereby the prime mover would attain the corrected on-speed condition in a minimum period of time, without under-shoot or over-shoot. As inferred above, the Quinn system included electronic apparatus which until recently has connoted the use of vacuum tubes, although the Quinn patent is not limited to such apparatus.

In the present invention, electronic apparatus such as vacuum tubes are eliminated in the discriminating and amplifying circuits and these are replaced with magnetic amplifiers comprising saturable reactors and rectifiers, with appropriate circuits to enable over-all operation of the system and to attain over-all governing effects which are generally similar to those attained by the Quinn invention. This invention eliminates the need for vacuum tubes and their attendant power supplies. The reliability of the well known vacuum tubes in primary control systems in aircraft has sometimes been questioned, so one of the purposes of the present invention is to increase the reliability of a system such as that taught by Quinn while losing none of its functional advantages. Since there is an opportunity for failure in some kinds of vacuum tubes, substitution of other apparatus is desirable at least until such time as vacuum tubes or apparatus having equivalent function may be developed to the point where they are completely dependable in primary control apparatus. By primary control apparatus is meant, such devices as engine governors and the like whose failure, or the failure of any part of them, might become catastrophic before replacement of the failed component could be made.

The present invention makes use of the properties of magnetic amplifiers which in general, include saturable reactors consisting of cores with pluralities of windings thereon, in the general form of transformers. When the core is magnetically saturated, the impedance of the output winding is low and will pass current provided from a separate power source. When the core is not saturated magnetically, the impedance of the output winding is high and acts as a dam to the flow of current. By controlling the saturation of the core through the energization of control windings, the output or load winding may be caused to pass or not to pass currents which are utilized to operate appropriate relays or other apparatus.

The details of the present invention may be more clearly appreciated by referring to the annexed drawings in conjunction with the following detailed description. In the drawings, which show several alternative arrangements of the invention:

Figs. 4A, 4B, 4C, 4D, 5A, 5B, 5C, 5D, 6A, 6B, 6C and 6D are wave form diagrams showing functioning of the invention of Figs. 1–3.

Fig. 8 is a circuit diagram of an embodiment of the invention as shown in Fig. 7.

Figure 1:
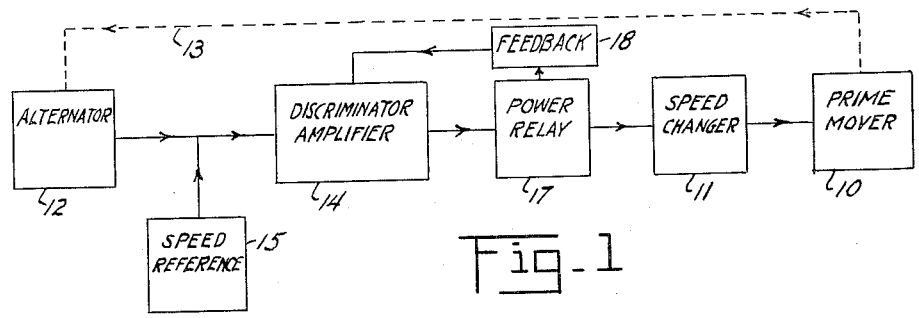
Fig. 1 is a block diagram showing a speed governor according to the invention, applied to the control of engine speed.

Referring to the block diagram of Fig. 1, 10 represents an engine, prime mover, or other device whose speed is to be controlled. A speed control mechanism of any suitable type is noted as 11, adjustment of which will produce change in engine speed. This, for instance, may comprise a controllable pitch aircraft propeller driven by the engine, or it may comprise a fuel control or any other suitable arrangement to control the power of the engine.

An engine driven alternator 12, productive of an electrical frequency proportional to engine speed, is mechanically or otherwise driven from the engine 10 by a linkage 13. Output from the alternator is fed to a discriminator amplifier 14 which is also linked with an adjustable speed reference 15, the discriminator amplifier 14 having an output signal which is indicative of the amount and direction of speed error existing between the speed reference and the engine. This discriminator is the assembly which yields a signal indicative of the amount and direction of off-speed. If the engine is on-speed, the effective output signal becomes zero. Since the corrective signals are of small magnitude, they are amplified magnetically in the unit 14. Discriminator amplifier output is fed to a relay system 17 serving to actuate the speed control mechanism 11. In order to provide anticipating signals, the relay system when operative energizes a feedback network 18 which acts upon the discriminator amplifier 14 to bias the output signal thereof, in the general manner described and claimed in Quinn Patent No. 2,541,666.

The several units mentioned above may have different detailed arrangement. The reference characters applied to Fig. 1 are also applied to Fig. 2. Fig. 3 while using the same general scheme as does Fig. 2, embodies a different form of alternator which is called 12–A, a different form of speed reference which is called 15–A and a different form of power relay which is called 17–A.

Figure 7:
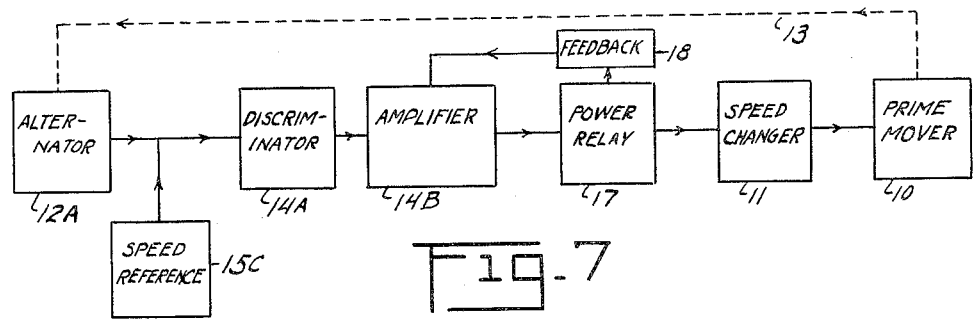
Fig. 7 is a block diagram showing a speed governor according to an alternative arrangement of the invention.

The alternative system shown in Figs. 7 and 8 is generally similar to that briefly described above, the principal difference being that the discriminator and amplifier are in two separate units which, in Figs. 7 and 8 are noted as 14–A and 14–B. The alternator utilized in Figs. 7 and 8 is of the same type as that used in Fig. 3.

Figure 2:
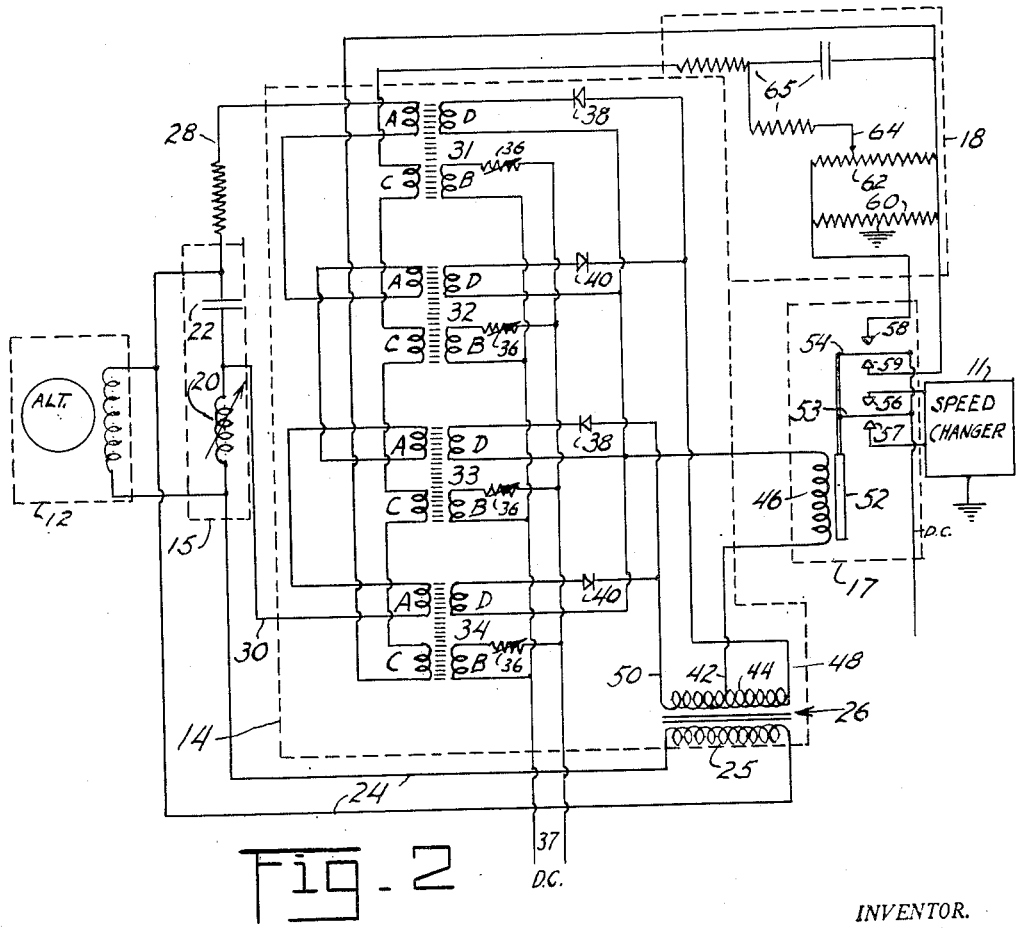
Fig. 2 is a circuit diagram of one embodiment of the invention in accordance with block diagram of Fig. 2.
Figure 3:
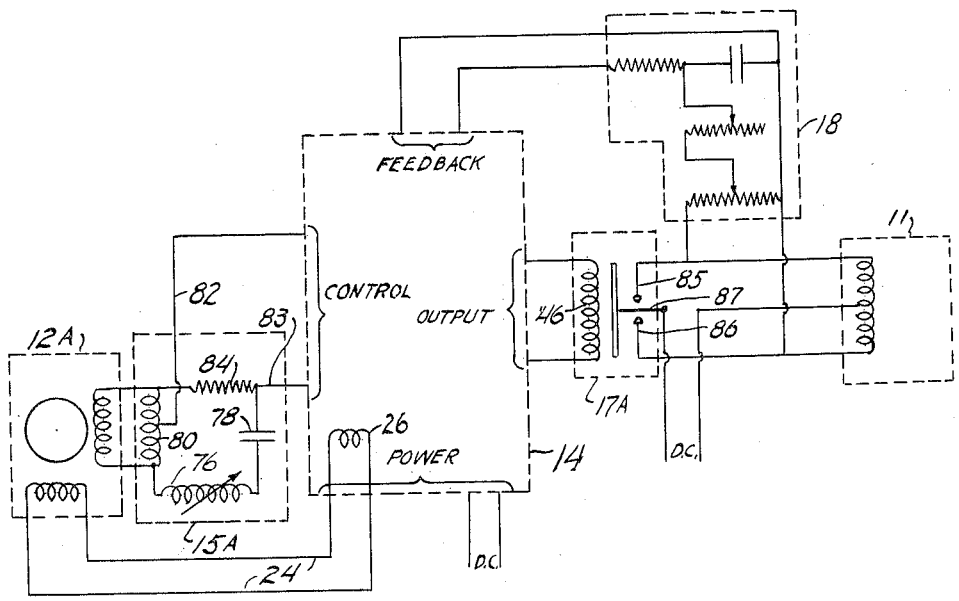
Fig. 3 is a simplified diagram of another embodiment of the invention in accordance with the block diagram of Fig. 1.

Reference may now be made to the specific circuit diagram of Fig. 2. Herein, the alternator 12 has a single phase output which is fed to the speed reference circuit 15 comprising a variable inductance 20 series connected with a capacitor 22. The speed reference circuit 15 constitutes a resonant network adjusted for a specific reference frequency. The alternator output is also fed directly through the leads 24 to the primary 25 of a power transformer 26. Output from the alternator and speed reference is taken from wires 28 and 30 which connect to opposite sides of the capacitor 22, in the wire 30 connecting between the capacitor 22 and the inductance 20. Voltage in the wires 28 and 30, by virtue of the phase difference created by the capacitor 22, is normally 90° out of phase with the alternator output at 24. The phase relation of the output at 28, 30, to that at 24, is normally 90°, or more or less than 90° if the alternator frequency deviates from the resonant frequency of the speed reference 15. If the alternator frequency is coincidental with the resonant frequency of the speed reference, the signals will have the form later to be described in connection with Figs. 4–A to 4–D. If the alternator frequency either is greater or less than the speed reference resonant frequency, the signals will be as represented in Figs. 5–A to 5–D and Figs. 6–A to 6–D as will be described.

The discriminator amplifier comprises four saturable reactors 31, 32, 33 and 34 each of which has a control winding A, a bias winding B, a feedback winding C, and an output winding D. These are designated by the above letters following the reference character of the respective saturable reactor. The several control windings 31–A to 34–A of the reactors are series connected to the leads 28 and 30, the windings 32–A and 33–A being reversed from the windings 31–A and 34–A to attain proper phase relationships. The bias windings 31–B to 34–B are parallel connected if desired, each connection including an adjustable resistor 36 for adjusting bias voltage supplied from a D. C. source 37. These windings 31–B to 34–B serve to hold the reactors near saturation but in a direction opposite to that provided by useful input signals. This bias is overcome by input signals of adequate strength to saturate the reactor to enable an output signal to pass the rectifiers mentioned below. The feedback windings 31–C to 34–C are series connected and are fed from the feedback network 18 which will be described, to modify the saturation of the reactors for obtaining acceleration response in the system.

The transformer 26, energized from the alternator, provides a source of power to operate the power relay 17 through the output windings 31–D to 34–D of the saturable reactors. The output windings 31–D and 33–D each include a rectifier 38 permitting current flow in one direction while the output windings 32–D and 34–D each include a rectifier 40 permitting current flow in the opposite direction. A center tap 42 of the secondary 44 of transformer 26 is connected to a solenoid 46 of the power relay 17, the other end of the solenoid being connected to the output windings 31–D to 34–D in the manner shown. The rectifiers 38 and 40 of the output windings 31–D and 32–D are connected to the end 48 of the secondary 44, while the rectifiers 38 and 40 of the output windings 33–D and 34–D are connected to the other end 50 of the secondary 44. By these connections, full energization of the solenoid 46 is afforded under conditions where the frequency of the alternator 12 is either above or below the adjustable fixed frequency of the speed reference 15.

An armature 52 of the power relay 17 may move up or down according to the polarization of the solenoid 46 and operates switch arms 53 and 54 simultaneously, both of these switch arms being connected to a source of direct current. According to the up or down movement of the armature 52, the arm 53 contacts points 56 or 57 which energizes the speed changer 11 to bring about speed increase or decrease in the prime mover. Concurrently, up or down movements of the arm 54 connects with points 58 or 59 which energizes the feedback circuit 18 which in turn energizes, in opposite polarity, the feedback windings 31–C to 34–C of the saturable reactors of the amplifier 14.

The feedback network comprises a resistor 60 with a grounded center tap so that when energized by the switch 54, this resistor impresses a voltage across a potentiometer 62, the polarity of the voltage being in accordance with the up or down movement of the switch 54. An appropriate part of this voltage is taken from a tap 64 on the potentiometer 62 and this voltage is impressed, through a lag network 65 upon the feedback windings 31–C to 34–C.

Reference may now be made to Figs. 4–A to 6–D which show the wave forms in the windings under different conditions of frequency and phase relation in the system. The voltage wave 70 is that produced by the alternator through transformer 26 and impressed on windings 31–D—34–D. The voltage wave 68, normally 90° out of phase with the wave 70, is impressed on windings 31–A—34–A, comprising alternator output as phase-shifted by the speed reference 15 in the windings 31–B to 34–B is represented at 72 and this holds the reactors toward non-conduction until the sum of the voltages 68 and 70 exceeds and is of opposite sign to the voltage 72. When these voltages exceed the influence of the bias, the windings D are rendered conductive, conduction in the windings D being represented at 74. Due to the effect of the rectifiers 38 and 40, conduction may only be in one direction in the output of each reactor. The direction for conduction in each figure, as controlled by rectifiers 38 and 40, is shown by an arrow.

Figs. 4–A to 4–D show the wave forms when alternator frequency coincides with the resonant frequency of the speed reference 15, the voltages 68 and 70 being 90° out of phase. Each reactor has a small output as shown, but the outputs are equal and off-set one another so that there is no net input to the power relay 17.

In Figs. 5–A to 5–D, the voltage 68 leads the voltage 70 by 45° representing a substantial speed error. In the reactor 31, the combined voltages 68 and 70 never exceed the bias voltage 72 so that the reactor 31 has no output. This is also true of the reactor 33. The reactors 32 and 34, however, produce extended ouputs 74 which combine to operate the power relay 17 in one direction.

In Figs. 6–A to 6–D, the voltage 68 lags the voltage 70 whereby reactors 32 and 34 have no output but reactors 31 and 33 have extended outputs 74 in the opposite direction from that described in connection with Figs. 5–A to 5–D, so that the output relay is operated in the opposite direction.

As the speed error increases, the phase difference between waves 68 and 70 approaches 0° or 180° according to the error direction, but never exceeds these values.

The bias voltage 72 may be devised from the full wave rectification of an A. C. power source.

Reference may now be made to Fig. 3 which shows a system which is an alternate to that of Fig. 2. Herein, the alternator 12–A has a two phase output, the phases being 90° apart. One phase is utilized to energize the transformer 26 within the discriminator amplifier 14. The other phase is fed through a speed reference circuit 15–A which comprises the input to the discriminator amplifier to energize the saturable reactor input windings A similar to those in Fig. 2. The alternator output is bridged by a load inductance 80 center tapped to form one input 82. The ends of the inductance 80 are series connected through a resistance 84, a capacitor 78 and a variable inductance 76, the other input lead 83 being taken from between the resistor 84 and the capacitor 78.

The power relay 17-A is substantially the same as that previously described in connection with Fig. 2, except that the switching portion thereof comprises a single switch arm 87 which may contact with a point 85 or a point 86 upon polarized energization of the solenoid 46. The leads from the points 85 and 86 serve to energize both the speed changer 11 and the feedback network 18. Either the single relay switching of Fig. 3 or the double relay switching of Fig. 2 may be utilized in the output relay of either embodiment of the system, the choice being a matter of preference in the design.

The essential difference between the Fig. 2 and Fig. 3 embodiments lies in the use of either a single phase or a two phase alternator. When the single phase alternator is used as in Fig. 2, the normally 90° phase relation required between input signals and output pulses is accomplished by the circuit arrangement of the speed reference 15. In the Fig. 3 arrangement, the normally 90° phase relation is accomplished by two phase alternator construction, utilizing a conventional form of speed reference circuit.

The wave forms of Figs. 4-A to 6-D are generally applicable to the Fig. 3 embodiment. In both the Fig. 2 and Fig. 3 embodiments, both discrimination of off-speed direction and amount, and amplification, are accomplished in the unit 14.

The embodiment of the invention shown in Figs. 7 and 8 differs from those previously described in that discrimination is accomplished by a rectifier network 14-A while amplification is accomplished alone in the magnetic amplifier 14-B. The amplifier 14-B is similar in principle to that previously described except that each saturable reactor requires five windings instead of four. For this arrangement, the alternator 12-A has a two phase output, the phases being 90° apart. An alternator output winding 88 feeds the primary of a transformer 90 which has two secondary windings 92 and 94. The second output winding 96 of the alternator 12-A feeds the primary of a transformer 98 the output of whose secondary 100 necessarily lies at 90° phase relation to the outputs of the secondaries 92 and 94. One end of the secondary 100 is connected to the speed reference 15-C which comprises an adjustable inductance 102 and a capacitor 104, these elements comprising a tuned circuit. The end 106 of the speed reference 15-C is connected through resistors 108 to the upper and lower ends respectively (as shown) of rectifier units 110 and 112. The lower end of the unit 110 and the upper end of the unit 112 (as shown) are connected together and to the other terminal of the transformer secondary 100. As the secondary 100 is energized in one direction, current will flow downwardly as shown in the rectifier unit 110 and upwardly in the rectifier unit 112. When energized in the opposite direction, the secondary 100 will urge current flow, but there will be no flow through the units 110 or 112.

The transformer secondary 92 is connected to the left end of the rectifier unit 110, whose right end is connected through a rectifier 114 and a suitable resistor through series connected input windings A of saturable reactors 116, 117, 118 and 119, the return circuit from these windings being established to a lead 120 to the other terminal of the transformer secondary 92.

One terminal of the transformer secondary 94 is connected to the left end of the rectifier unit 112 whose right end connects through a rectifier 122 and a suitable resistor to input windings A' of the reactors 116–119, the return circuit being established through a lead 124 to the other end of the transformer secondary 94.

When the rectifier units 110 and 112 are conducting they act as switches. A positive voltage from the secondary 92 will be conducted across the rectifier 114 to energize the reactor input windings A. At this time, the voltage from the secondary 94 impressed on the left end of unit 112 is negative, so that no current is transmitted to the input windings A' of the saturable reactors. When the voltage from secondary 94 is positive, unit 112 will conduct to energize reactor input windings A'. At this time, unit 110 does not cross-conduct, as voltage from secondary 92 is negative. When either units 110 or 112 cross-conduct, flow is through rectifiers 111 or 111', secondary 100, inductance 102, lead 106, rectifiers 113 or 113', output rectifiers 114 or 122 and windings A or A'.

Figure 9:
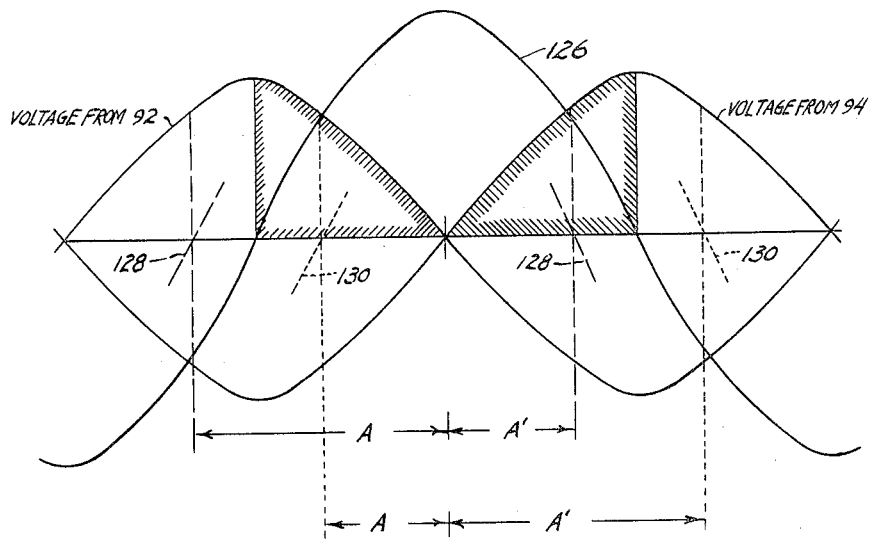
Fig. 9 is a wave form diagram indicating the functioning of the invention of Figs. 7 and 8.

Cross conduction through the rectifier unit 110 will normally occur for a quarter-cycle as shown in Fig. 9 when voltage from secondary 92 is positive during which, reactor windings A will be energized. Cross conduction will normally occur through another quarter-cycle when the secondary 94 impresses a positive voltage on the left end of the rectifier unit 112, during which quarter-cycle, reactor windings A' will be energized.

Upon the occurrence of an off-speed, the output of the winding 100 will be phase shifted in one direction or the other by the influence of the speed reference network 15-C, which will move the wave 126 of Fig. 9 leftwardly as at 128 (dash lines) or rightwardly as at 130 (dot lines) to alter the relative conduction time of the rectifier units 110 and 112. Thereby, the net current flow through the reactor input windings A will vary relative to the net current flow through the reactor input windings A', thus to vary the amount of output current from the magnetic amplifier windings D of reactors 116-119.

Bias windings B of reactors 116-119 are energized from either a D. C. or a rectified A. C. source to hold the reactors unsaturated. When the net voltages in either the input windings A, or A' and C overcome the bias to a degree sufficient to saturate the reactors in a direction to allow current flow through rectifiers 38 or 40, the windings D will conduct, through the rectifiers 38 and 40, so that polarized energization of the solenoid 46 of the output relay 17 will result. The reactor output windings D and the solenoid 46 are energized from a transformer 26' which may be supplied from an independent power source. Polarized energization of the solenoid winding 46 is accomplished in the same manner as has been described in detail in connection with the same components of the embodiment of the invention shown in Fig. 2.

The feedback network 18 may be energized upon operation of the output relay 17 as has been described previously and when the feedback network is active, the feedback windings C of the saturable reactors 116 to 119 are energized to influence the saturation of the reactors for the purpose of injecting into the system a synthetic correction for acceleration of the prime mover, in the same fashion as has been described previously. In Fig. 8, the closure of the output relay 17 in either direction energizes the speed changer 11 to correct the speed of the prime mover.

Though several embodiments illustrating the invention have been shown and described, it is to be understood that the invention may be applied in other and various forms. Changes may be made in the arrangements, without departing from the spirit of the invention. Reference should be had to the appended claims for definitions of the limits of the invention.

What is claimed is:

1. A discriminating feedback magnetic amplifier circuit system producing polarized D. C. signals, comprising four saturable reactors each having four windings therein designated A, B, C and D, said A windings being serially connected, two with leads in one sense and two with leads in the other sense, an A. C. signal generator having two outputs of the same frequency, network means to change the phase relation of said outputs relative to each other with change in speed of said generator from a desired speed, one of said generator outputs being connected to said A windings, said B windings being interconnected, adjustable means to energize said B windings jointly with D. C. energy to bias said reactors, said C windings being interconnected, a transformer having a primary energized by the other output of said signal generator and having a center-tapped secondary, a load inductance connected at one end to said center tap and at its other end to one end of each said D winding, the other ends of two of said D windings being connected to one end of said secondary, the other ends of the other two of said D windings being connected to the other end of said secondary, each said D winding having a rectifier in circuit therewith, the rectifiers of two commonly connected D windings passing energy oppositely, switch means actuated by said load inductance according to the direction of current flow therethrough, a feedback power source, and connections from said power source through said switch means and through said C windings, the direction of current flow in said C windings being such as to unsaturate said reactors.

2. A system according to claim 1 wherein the connections from said feedback power source through said C windings includes a time delay network.

References Cited in the file of this patent

UNITED STATES PATENTS

| | | |
|---|---|---|
| 2,500,548 | Keller | Mar. 14, 1950 |
| 2,512,317 | Edwards | June 20, 1950 |
| 2,541,666 | Quinn | Feb. 13, 1951 |
| 2,554,203 | Morgan | May 22, 1951 |
| 2,631,268 | Ranson | Mar. 10, 1953 |